United States Patent [19]

Schoon

[11] Patent Number: 4,586,057
[45] Date of Patent: Apr. 29, 1986

[54] COMPENSATION CIRCUITRY FOR A LASER PRINTER USING A SELF-RESONANT SCANNER

[75] Inventor: David J. Schoon, North Branch, Minn.

[73] Assignee: Minnesota Mining and Manufacturing Company, St. Paul, Minn.

[21] Appl. No.: 589,772

[22] Filed: Mar. 15, 1984

[51] Int. Cl.[4] .............................................. G01D 9/42
[52] U.S. Cl. ..................... 346/108; 358/293
[58] Field of Search ....................... 346/108 R, 107 R; 358/206, 208, 293; 331/1 A, 25; 350/6.6, 6.9, 6.91

[56] References Cited

U.S. PATENT DOCUMENTS 4,204,233  5/1980  Swager ................................. 358/293
4,268,867  5/1981  Trainio ................................. 358/293
4,320,420  3/1982  Rider ..................................... 358/206

Primary Examiner—E. A. Goldberg
Assistant Examiner—M. Reinhart
Attorney, Agent, or Firm—Donald M. Sell; James A. Smith; Robert L. Marben

[57] ABSTRACT

Compensation circuitry for a laser printer using a self-resonant scanner wherein a clock generator (VCO) and an address counter operated between start of scan (SOS) and end of scan (EOS) signals are used in the generation of data clock signals. A flip-flop circuit is connected to receive the EOS signal and the output from a higher order bit output of the address counter to provide logic circuitry with an indication of whether the clock generator (VCO) frequency should be raised or lowered. The logic circuitry provides an input to a digital to analog means which is connected to the control input of the clock generator (VCO).

4 Claims, 3 Drawing Figures

COMPENSATION CIRCUITRY FOR A LASER PRINTER USING A SELF-RESONANT SCANNER

BACKGROUND OF THE INVENTION

The invention presented herein relates to circuitry for automatic adjustment of the frequency of a clock generator used in the generation of data clock signals for a laser printer to compensate for variations in scanner frequency and data clock rates for a laser printer using a self-resonant scanner.

Self-resonant scanners can be used in a scanning system for a laser printer for providing line scans at an imaging receptor which receives the output from the laser. Since self-resonant scanners have a sinusoidal velocity, data clock signals are generated to correct for the sinusoidal velocity of the self-resonant scanner so that the desired potential on-off operations of the laser along a scan line of the imaging receptor will be at equally spaced intervals. In one such an arrangement, a first clock generator provides clock signals which are spaced by equal time intervals from which clock signals are selected that can be used to control the frequency of a second clock generator which provides the data clock pulses for use in supplying control data signals to the laser. Selection of clock pulses from the pulses provided by the first clock generator is controlled by a program stored in a programmable read only memory (PROM). The program is based in part on the sinusoidal variation in velocity of the scanner. The PROM is addressed by an address counter which receives the output of the first clock generator. The frequency of the self-resonant scanner can vary slightly which is objectionable since it causes variations between expected and actual beam velocity which, in turn, if not compensated for, will result in other than desired pixel spacing. In addition, the arrangement described also produces some undesirable variations in the frequency of the second clock generator which causes similar variations between expected and actual beam velocity which, in turn, if not compensated for, will result in errors in the pixel spacing.

SUMMARY OF THE INVENTION

The invention presented herein provides a solution to the problems caused by variations in the scanner frequency and data clock rate in a laser printer having self-resonant scanner wherein the laser printer provides a start of scan (SOS) signal and an end of scan (EOS) signal for each scan line with a clock generator and an address counter provided for use in the generation of data clock signals. The address counter is operated by clock signals from the clock generator which are provided during each scan line between the occurrence of the SOS signal and the EOS signal. Compensation for the undesirable variations in the frequency of the scanner and in the data clock rate is provided for such a laser printer by circuitry embodying the present invention which includes using a voltage controlled oscillator (VCO) as the clock generator; a digital to analog means connected to the control input of the VCO; a flip-flop circuit connected for receiving each EOS signal and connected to a higher order bit of the address counter, the flip-flop providing a first signal if the transition in state at the higher order bit has not occurred when the EOS signal is presented and providing a second signal if the transition in state at the higher order bit has occurred when the EOS signal is presented; and logic circuitry connected to the flip-flop circuit for receiving the first and second signals and connected to the digital to analog means for providing the digital input for the digital to analog means, the logic means changing the digital input to increase the frequency of the VCO when the flip-flop produces the first signal and to decrease the frequency of the VCO when the flip-flop produces the second signal.

The logic circuitry can be provided by a microprocessor, which would normally be available in such a laser printer, making it easy to provide a time period after each increment or decrement of the digital input to allow the clock generator to respond to the change. The logic circuitry also keeps a record of whether the digital input is incremented or decremented so that once correction in the digital input alternates between an incrementation and a decrementation, further correction of the digital input is not required and the laser printer can be allowed to print a page. The circuitry provides correction of the VCO frequency prior to the start of the printing of each page by the laser printer.

BRIEF DESCRIPTION OF THE DRAWINGS

A better understanding of this invention, including its novel features and advantages, will be obtained upon consideration of the following detailed description and accompanying drawings wherein.

DETAILED DESCRIPTION

Figure 1:
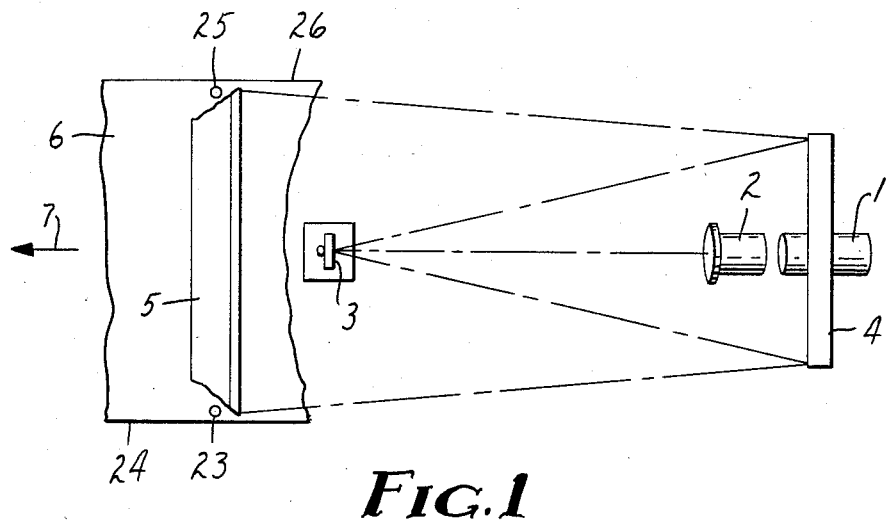
FIG. 1 is a plan view in schematic form illustrating the scanning portion of a laser printer apparatus.
Figure 2:
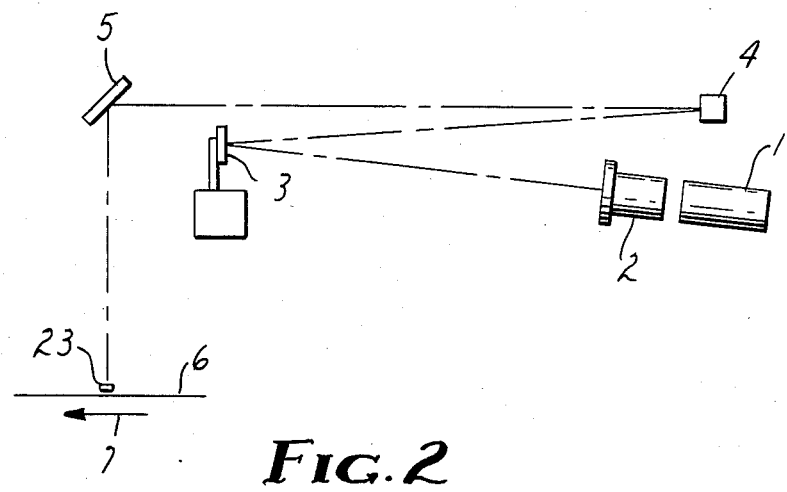
FIG. 2 is a side view of the scanning portion of a laser printer apparatus shown in FIG. 1.

Referring to FIG. 1 of the drawings, a plan view is shown illustrating the scanning portion of a laser printer which includes a laser 1, which can be a laser diode type, a lens system 2, mirrors 4 and 5, a self-resonant scanner having a mirror 3, and an imaging element or receptor 6. The imaging receptor 6 can be of any construction which is responsive to the energy output of a laser. Thus, the receptor 6 can be a photoconductor or can be of a material having magnetic properties that are altered by the selective application of heat. Use of thermal imaging paper for the receptor 6 is also possible. The imaging receptor 6 will, for purposes of illustration, be referred to as a photoconductor element. Such elements are also shown in FIG. 2, which is a side view of the apparatus of FIG. 1. The photoconductor 6 is only partially shown. It is understood, however, that it can take the form of a belt, drum or flexible sheet.

Light from the laser 1 is focused by the lens system 2 onto the mirror 3 of the resonant scanner which oscillates to direct the light to mirror 4 causing the light to move as a scan lengthwise of mirror 4. The light presented to mirror 4 is reflected to mirror 5 which is positioned to direct such light to the photoconductor 6 to provide a line scan at the photoconductor 6. The photoconductor 6 is moved transversely of the light scan that is provided so a line-by-line scan is provided at the photoconductor 6. Movement of the photoconductor 6 is indicated by the arrow 7.

Apparatus of FIGS. 1 and 2 requires the laser 1 to be controlled for potential on or off operation at the same point in one scan line as in the preceding scan line. Failure to precisely control this action will cause the image produced at the photoconductor to present an irregular appearance and portions of an image intended to present vertical lines will not be exactly vertical. The solution to this problem is solved in part by the use of the resonant scanning mirror 3 since its movement is highly reproducible from one line scan to the next due to its high "Q". The velocity of the movement of the scanning mirror 3, however, is sinusoidal so the scan at each end portion of a scan line is carried out at a velocity that is less than the velocity during the center portion of a scan. The supply of image defining data signals to the laser 1, which determine the on-off condition for the laser, must be provided in a manner that takes into consideration the sinusoidal velocity of the scanning mirror 3 so that the on-off control of the laser 1 and, therefore, the image areas, are uniformly spaced or positioned at predetermined points in a scan line.

Figure 3:
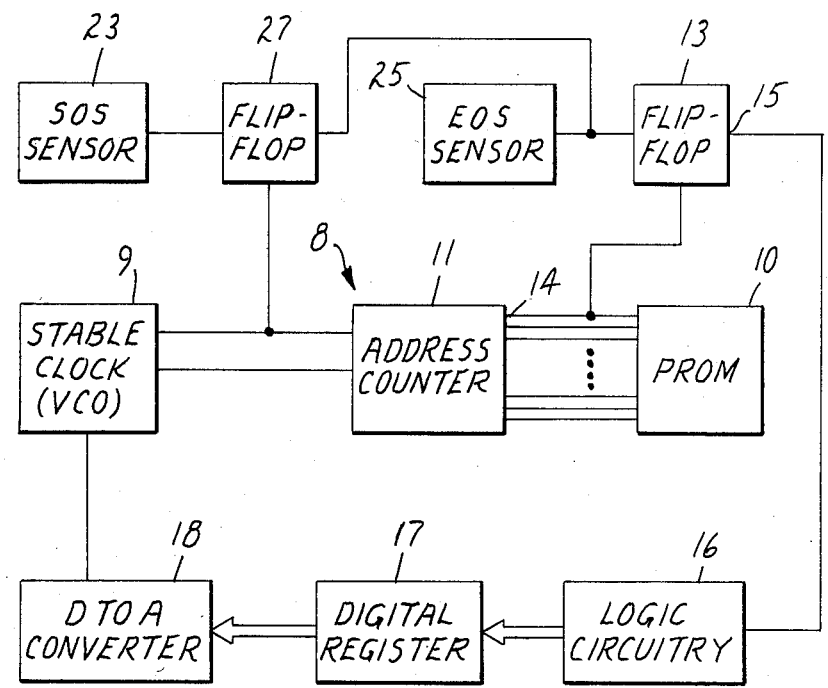
FIG. 3 is an electrical block diagram of clocking circuitry embodying the invention which is usable with the scanning portion of a laser printer as illustrated in FIGS. 1 and 2.

Data clocking signal circuitry can be provided by which the image defining data signals can be supplied for on-off control of the laser 1, in the desired manner indicated above. Referring to FIG. 3, a portion of one such data clocking signal circuit is shown which includes a clock signal producing portion or means 8 that provides clock signals which are equally spaced by equal time intervals and selects from such clock signals, clock signals that can be used for the production of data clock signals so that desired on-off operation of the laser 1 will occur when the laser 1 is directed via the mirror of the self-resonant scanner to predetermined points along a scan line. Except for special imaging applications, such predetermined points are equally spaced along the scan line and have a density equal to the resolution desired for the image in the direction of the line scan. Selection of the clock signals includes consideration of sinusoidal velocity of the self-resonant mirror plus the characteristics of the circuitry that uses the selected clock signals to produce data clock signals which serve to clock data signals that determine the on-off operation of the laser.

The clock signal producing portion 8 includes a stable clock generator 9, an address counter 11 and an addressable memory, such a programmable read only memory (PROM) 10. The stable clock generator 9 provides the equal spaced clock signals for each scan line with selection of the clock signals accomplished by the use of data stored in the PROM 10. The selection data stored in the PROM 10 is addressed by the address counter 11 that is operated by the output of the stable clock generator 9. The remainder of the circuitry involved in the production of data clock signals is not disclosed since it is not a part of the present invention and is not required for an understanding of the present invention.

It is apparent that a signal is required which serves to establish the position of the self-resonant mirror 3 at a certain point during the start of a line scan relative to the surface of the photoconductor 6 to be scanned by the laser output so that the stable clock 9 and address counter 11 will have reference points for initiating their operation for each scan line. Similarly, a signal is needed that is indicative of the completion of a forward scan so that the operation of the stable clock 8 and address counter 11 can be terminated. The manner in which such start of scan line (SOS) and end of scan line (EOS) signals are produced is not important except to the extent that the start of scan signal must be provided at the same point for each scan line. One convenient way for providing the SOS signal and the EOS signal is illustrated in FIG. 1. A light-to-electric transducer 23 is positioned just above and a short distance, such as about 1.3 centimeters, inside the start of line scan edge 24 of the photoconductor 6 and in line with the scan line so as to receive light from laser 1 via mirror 5 when light from laser 1 is provided as the scanning mirror 3 begins a writing or scanning movement. When light is thus provided to the light-to-electric transducer 23, an SOS signal is produced. Similarly, a light-to-electric transducer 25 is positioned just above the photoconductor 6 and a short distance, such as about 1.3 centimeters, inside the end of line scan edge 26 of the photoconductor 6 and in line with the scan line so as to receive light from laser 1 via mirror 5 when light from laser 1 is provided as the scanning mirror 3 nears the end of a writing or scanning movement. When light is thus provided to the transducer 25, an EOS signal is produced. Return movement of the scanning mirror is not used as a writing or scanning movement so the laser 1 is arranged to be held off during such return movement by suitable circuitry (not shown). The light-to-electric transducers 23 and 25 can be photodetector devices which are readily available. A small photodetector is used, which with the sharp light beam from the laser 1, causes the EOS and SOS signals to precisely occur at the same point in one scan line to the next.

A flip-flop circuit 27 is provided to indicate the occurrences of the SOS and EOS signals at the stable clock generator 9 and the address counter 11 so they are operable during the time interval between occurrence of an SOS signal and the EOS signal. The SOS sensor 23 is connected to the flip-flop circuit 27 to determine one stable state at its output with the EOS scan sensor 25 connected to the flip-flop circuit 27 to determine the other stable state for the flip-flop circuit. The output of the flip-flop 27 is connected to the stable clock generator 9 and to the address counter 11 so they are operable between the occurrence of an SOS signal and an EOS signal.

Variations in the frequency of the self-resonant scanner cause distortions in the spacing between clock pulses. Variations also occur in the data clock rate which cause the same problem. These problems can be compensated by adjustment of the frequency of the stable clock generator 9 which is provided by the present invention. A voltage controlled oscillator having input control 12 is used for the stable clock generator 9. In addition, flip-flop circuit 13, such as a D-type flip-flop circuit, is provided which receives the EOS signal at its clock input from the EOS sensor 25 provided by a photodetector. The data input for the flip-flop circuit 13 is connected to a higher order bit output 14 of the address counter 11 which is shown in FIG. 3 to be the most significant bit (MSB). Considering the circuitry described up to this point, the flip-flop circuit 13 will provide a first signal at its output 15 if the transition in state on the connected higher order bit output 14 has not yet occurred at the time the EOS signal is received by the flip-flop 13. If the transition in state on the selected higher order bit output has occurred at the time the EOS signal is received, the flip-flop 13 provides a second signal that is different from the first signal at its output 15. If the first signal is provided at the output 15 of the flip-flop 13, the frequency of the VCO 9 should be increased. The frequency should be decreased if the second signal is provided at the output 15 when the EOS signal is received.

A logic circuit 16, which is connected to the output of flip-flop 13, is provided by the present invention along with a digital to analog means, including a digital register 17, which receives a digital input in the form of a plurality of bits, e.g. one byte (8 bits) from the logic circuitry 16, and a digital to analog converter 18 which is connected between the control input 12 of the VCO 9 and the output of digital register 17.

Since it is contemplated that this invention will be used in apparatus using a self-resonant scanner for providing a very accurate and repeatable scan, such apparatus can be expected to have at least one microprocessor which can be readily programmed to provide the logic required for the logic circuit 16. It is contemplated also that any adjustment of the frequency of the VCO 9 will, in case of a laser printer, be done prior to the printing of a page making the microprocessor of a laser printer available for a time when it can carry out the required logic.

During the time made available for determining whether an adjustment of the frequency of the VCO is needed and making any required adjustment, the logic circuitry 16 monitors the output 15 of the flip-flop 13 to determine which of the first and second signals mentioned earlier is presented at the time the EOS signal is received from the EOS sensor 25. The logic circuitry 16 also provides the digital input to the digital register 17 which determines the signal to be applied to the control input of the VCO 9. If the first (second) signal at the output 15 of flip-flop 13 is provided upon receipt of the EOS signal, the logic circuit 16 responds by incrementing (decrementing) the contents of the digital register 17 which is applied to the VCO 9 via the digital to analog converter 18 to increase (decrease) the frequency of the VCO 9. The logic circuitry 16 provides time sufficient to allow the VCO to respond to the change at its control input. If the first (second) signal is presented to the logic 16 when the output 15 of flip-flop 13 is again examined following the receipt of an EOS signal, the contents of digital register 17 is again incremented (decremented) with such process as described repeated until the second (first) signal is presented at the output 15 indicating a need to decrease (increase) the frequency of the VCO 9 and, therefore, decrement (increment) the contents of the digital register 17 to effect a decrease (increase) in the frequency of the VCO 9. The logic circuitry 16 keeps track of the incrementing and decrementing made of the contents of the digital register 17 looking for the time when the logic circuitry switches back and forth between a one bit increment and a one bit decrement indicating the VCO 9 is operating as close to the ideal frequency as is possible with the resolution of the digital register 17, the digital to analog converter 18 and the VCO 9. Once the laser printer starts to print a page no further adjustments of the frequency of the VCO 9 are made.

The invention presented herein may be embodied in other specific forms without departing from the spirit or essential characteristics thereof. The embodiment that has been described is, therefore, considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. Circuitry for altering the frequency of a clock generator that provides clock signals during each scan line of a laser printer for use in the generation of data clock signals for a laser printer having a self-resonant scanner wherein the laser printer provides a start of scan (SOS) signal and an end of scan (EOS) signal for each scan line with an address counter used in the generation of the data clock signals and connected for receiving the clock signals provided between occurrence of an SOS signal and the occurrence of an EOS signal including:

a voltage controlled oscillator (VCO) as the clock generator;

a digital to analog means connected to the control input of said VCO;

a flip-flop circuit connected for receiving each EOS signal and connected to a higher order bit output of the address counter, said flip-flop providing a first signal if the transition in state at said higher order bit output has not occurred when the EOS signal is presented and providing a second signal if the transition in state at said higher order bit output has occurred when the EOS signal is presented;

logic circuitry connected to said flip-flop circuit for receiving said first and second signals and connected to said digital to analog means for providing the digital input to said digital to analog means, said logic circuitry changing the digital input to increase the frequency of the VCO when said flip-flop produces said first signal and decreasing the frequency of the VCO when said flip-flop produces said second signal.

2. The circuitry according to claim 1 wherein said logic circuitry is a programmed microprocessor.

3. The circuitry according to claim 1 wherein said higher order bit output is the most significant bit output of the address counter.

4. The circuitry according to claim 1 wherein said digital to analog means includes a digital register connected to said logic circuitry and a digital to analog converter connected intermediate the output of said digital register and the control input of said VCO.

* * * * *